United States Patent [19]

Knox

[11] Patent Number: 5,414,031
[45] Date of Patent: May 9, 1995

[54] INTUMESCENT NONHALOGENATED FLAME RETARDANT POLYSTYRENE COMPOSITION

[75] Inventor: Carol L. Knox, Monroeville, Pa.

[73] Assignee: Polymer Product Company, Inc., Stockertown, Pa.

[21] Appl. No.: 155,043

[22] Filed: Nov. 19, 1993

[51] Int. Cl.$^6$ .............. C08K 13/02; C08K 5/34; C08K 3/32; C08L 9/06
[52] U.S. Cl. .................. 524//101; 525/98; 524/416
[58] Field of Search ............ 524/101, 416; 525/98

[56] References Cited

U.S. PATENT DOCUMENTS

| | | | |
|---|---|---|---|
| 4,193,945 | 3/1980 | Bertelli et al. | 260/45.8 N |
| 4,198,493 | 4/1980 | Marciandi | 525/164 |
| 4,727,102 | 2/1988 | Scarso | 524/100 |
| 4,853,424 | 8/1989 | Staendeke et al. | 523/506 |
| 4,957,950 | 9/1990 | Staendeke et al. | 523/205 |
| 5,227,416 | 7/1993 | Knox | 524/101 |

FOREIGN PATENT DOCUMENTS

77342/87 8/1987 Australia .
WO90/09418 8/1990 European Pat. Off. .

OTHER PUBLICATIONS

K. K. Shen et al, "Zinc Borate as a Flame Retardant, Smoke Suppressant, and Afterglow Suppressant in Polymers", *Fire and Polymers*, Chapter 12, pp. 157–177.

"Thermoplastic Elastomers", *Elastomers*, edition 2, The International Plastic Selector, Inc., 1980.

S. Dotson et al, "Modifiers", *Modern Plastics Encyclopedia*, Mid–October 1990 Issue, vol. 67, No. 11, pp. 192, 195–196.

*Encyclopedia of Polymer Science and Technology*, Plastics, Resins, Rubbers, Fibers, "Rubber–Reinforced Materials", John Wiley and Sons, Inc., vol. 7, pp. 705–709, 1969.

*Primary Examiner*—James J. Seidleck
*Assistant Examiner*—I. Zemel

[57] ABSTRACT

An intumescent nonhalogenated flame retardant polystyrene composition having high impact strength comprises polystyrene, ammonium polyphosphate, tris(2-hydroxyethyl) isocyanurate, hydrated zinc borate, and substantially amorphous elastomeric polymer.

15 Claims, No Drawings

INTUMESCENT NONHALOGENATED FLAME RETARDANT POLYSTYRENE COMPOSITION

The current market for flame retardant additives for polystyrene is dominated by halogenated flame retardant additives. Halogenated flame retardants are chlorine—containing and/or bromine—containing compounds which, while providing flame retardant properties to the polystyrene, also produce toxic gases and generate copious quantities of smoke. There is a growing demand for nonhalogenated flame retardants that are safer and emit less smoke.

Intumescent nonhalogenated flame retardant additives have been blended with polystyrene, but when used in amounts sufficient to impart intumescent flame retardance, they also result in polystyrene compositions having low impact strength.

Intumescent nonhalogenated flame retardant polystyrene compositions have now been discovered which have flexibility. Accordingly, the invention is an intumescent nonhalogenated flame retardant polystyrene composition comprising: (a) polystyrene; (b) ammonium polyphosphate wherein the weight ratio of the ammonium polyphosphate to the polystyrene in the intumescent nonhalogenated flame retardant polystyrene composition is in the range of from 0.2:1 to 3.2:1; (c) tris(2-hydroxyethyl) isocyanurate; (d) hydrated zinc borate; and (e) substantially amorphous elastomeric polymer wherein the weight ratio of the substantially amorphous elastomeric polymer to the polystyrene in the intumescent nonhalogenated flame retardant polystyrene composition is in the range of from 0.05:1 to 0.3:1.

Any of the polystyrenes which are thermoplastic solids at room temperature may be used in the present invention.

The ammonium polyphosphates are known polymeric phosphates having P-O-P linkages and may be represented by the formula:

$$H_{n-m+2}(NH_4)_m P_n O_{3n+1} \qquad (I)$$

wherein the average value of n is at least about 10, the average value of m is a number up to n+2, and the ratio m/n is in the range of from about 0.7 to about 1.2. In most cases the average value of n is in the range of from about 10 to about 1000. From about 250 to about 750 is preferred. The values of n and m for any particular compound will be positive integers, while the average values of n and m for a mixture of compounds constituting the ammonium polyphosphate may each individually be a positive integer or a positive number which is not an integer. Ammonium polyphosphate is often is abbreviated "APP".

The amount of ammonium polyphosphate present in the intumescent nonhalogenated flame retardant polystyrene composition can vary considerably but usually the weight ratio of the ammonium polyphosphate to the polystyrene in the intumescent nonhalogenated flame retardant polystyrene composition is in the range of from 0.1:1 to 3.2:1. Often the weight ratio of the ammonium polyphosphate to the polystyrene in the intumescent nonhalogenated flame retardant polystyrene composition is in the range of from 0.3:1 to 2:1. From 0.5:1 to 1:1 is preferred.

Tris(2-hydroxyethyl) isocyanurate [CAS 839-90-7] is a known compound.

The amount of tris(2-hydroxyethyl) isocyanurate present in the intumescent nonhalogenated flame retardant polystyrene composition can be widely varied. In most cases the weight ratio of the tris(2-hydroxyethyl) isocyanurate to the polystyrene in the intumescent nonhalogenated flame retardant polystyrene composition is in the range of from 0.04:1 to 2:1. Often the weight ratio of the tris(2-hydroxyethyl) isocyanurate to the polystyrene in the intumescent nonhalogenated flame retardant polystyrene composition is in the range of from 0.1:1 to 1:1. From 0.2:1 to 0.5:1 is preferred.

Hydrated zinc borates with different ratios of $ZnO:B_2O_3:H_2O$ can be readily prepared by reacting zinc oxide with boric acid. Examples of such hydrated zinc borates include zinc borate-2 water, zinc borate-3.5 water, zinc borate-7.5 water, and zinc borate-9 water. More specific examples of hydrated zinc borates include those represented by the formulas $2ZnO.3B_2O_3.9H_2O$, $2ZnO.3B_2O_3.7.5H_2O$, $ZnO.B_2O_3.2H_2O$, and $2ZnO.3B_2O_3.3.5H_2O$. It should be recognized that the foregoing formulas indicate ratios of $ZnO:B_2O_3:H_2O$ and that they may be, but are not necessarily, molecular formulas. Indeed, the molecules may be larger than the formulas shown by integral multiples. While any of the hydrated zinc borates may be used, zinc borate-3.5 water is preferred. Hydrated zinc borate represented by the formula $2ZnO.3B_2O_3.3.5H_2O$ is particularly preferred.

The amount of hydrated zinc borate present in the polystyrene composition can also be widely varied. In most cases the weight ratio of the hydrated zinc borate to the polystyrene in the intumescent nonhalogenated flame retardant polystyrene composition is in the range of from 0.00501:1 to 0.8:1. Often the weight ratio of the hydrated zinc borate to the polystyrene in the intumescent nonhalogenated flame retardant polystyrene composition is in the range of from 0.05:1 to 0.5:1. From 0.1:1 to 0.2:1 is preferred.

Substantially amorphous elastomeric polymers are known materials. Examples of substantially amorphous elastomeric polymers include substantially amorphous elastomeric polybutadiene (especially substantially amorphous elastomeric cis-polybutadiene), substantially amorphous elastomeric styrene-butadiene copolymer, and substantially amorphous elastomeric ethylene-propylene-diene terpolymer. Commercially available substantially amorphous elastomeric polymers include Stereon ® 840A styrene-butadiene block copolymer (Firestone Tire & Rubber Co.) and Finaprene ® 502 styrene-butadiene block copolymer (Fina Oil and Chemical Company).

The amount of substantially amorphous elastomeric polymer present in the intumescent nonhalogenated flame retardant polystyrene composition is susceptible to wide variation. In most cases the weight ratio of the substantially amorphous elastomeric polymer to the polystyrene in the intumescent nonhalogenated flame retardant polystyrene composition is in the range of from 0.05:1 to 0.4:1. Often the weight ratio of the substantially amorphous elastomeric polymer to the polystyrene in the intumescent nonhalogenated flame retardant polystyrene composition is in the range of from 0.08:1 to 0.3:1. From 0.1:1 to 0.2:1 is preferred.

A material which may optionally be present in the intumescent nonhalogenated flame retardant polystyrene composition is titanium dioxide. In most cases the titanium dioxide is rutile, anatase, brookite or a mixture thereof. The preferred titanium dioxide is rutile.

When titanium dioxide is used, the weight ratio of the titanium dioxide to the polystyrene in the intumescent nonhalogenated flame retardant polystyrene composition is ordinarily in the range of from 0.0001:1 to 0.2:1. Often the weight ratio of the titanium dioxide to the polystyrene in the intumescent nonhalogenated flame retardant polystyrene composition is in the range of from 0.002:1 to 0.1:1. From 0.005:1 to 0.05:1 is preferred.

Another material which may optionally be present in the intumescent nonhalogenated flame retardant polystyrene composition is alkylamine wherein the alkyl group contains from 12 to 32 carbon atoms. Frequently the alkyl group contains from 14 to 20 carbon atoms. from 16 to 18 is preferred. The preferred alkylamine is stearylamine.

Presence of the alkylamine in the intumescent nonhalogenated flame retardant polystyrene formulation is optional, but desirable since it tends to reduce blooming of one or more components of the intumescent nonhalogenated flame retardant polystyrene composition. When used, the weight ratio of the alkylamine to the polystyrene in the intumescent nonhalogenated flame retardant polystyrene composition is normally in the range of from 0.0001:1 to 0.2:1. In many cases the weight ratio of the alkylamine to the polystyrene in the intumescent nonhalogenated flame retardant polystyrene composition is in the range of from 0.0025:1 to 0.1:1. From 0.005:1 to 0.05:1 is preferred.

Other materials which may optionally be present in the intumescent nonhalogenated flame retardant polystyrene composition include mold release agents, dyes, other pigments, antioxidants, ultraviolet light stabilizers, and lubricants.

The listing of optional ingredients discussed above is by no means exhaustive. These and other ingredients may be is employed in their customary amounts for their customary purposes so long as they do not seriously interfere with good polymer formulating practice.

The intumescent nonhalogenated flame retardant polystyrene composition of the invention can be prepared by simply admixing the various ingredients.

In those instances where it is desired to form a concentrate which will later be diluted with additional quantities of polystyrene, the relative proportions of the other ingredients to polystyrene will be high. In those circumstances where it is desired to form the final product, the relative proportions will be lower.

The flame retardancies of the intumescent nonhalogenated flame retardant polystyrene compositions of the invention are high. In most instances the UL-94 rating is V-0.

As used herein and in the claims, the UL-94 rating is ascertained by testing bars of the polystyrene composition in accordance with the procedure of the Vertical Burning Test for Classifying Materials 94V-0, 94V-1, or 94V-2 of UL 94 Standard for Tests for Flammability of Plastic Materials for Parts in Devices and Appliances, ANSI/UL-94-1979, dated Jan. 24, 1980. Also as used herein and in the claims, the Limiting Oxygen Index is determined in accordance with ASTM D 2863-87, American Society for Testing and Materials.

The invention is further described in conjunction with the following examples and comparative examples which are to be considered illustrative rather than limiting, and in which all parts are parts by weight and all percentages are percentages by weight unless otherwise specified.

For first screening in each of the examples, polystyrene was introduced into a Brabender Plasti-Corder mixer and melted. The other ingredients were added to the melt and the materials were mixed at 175° C. until uniform to produce a test composition. The molten test composition was placed between polytetrafluoroethylene plates and pressed in a laboratory press at 190° C. for several minutes until the test composition was pressed into a flat sheet. After cooling, the sheet was cut, stacked, and repressed with 1.6 millimeter (1/16 inch) shims. The cutting,stacking, and pressing process was repeated until a uniform 1.6 millimeter plaque without any noticeable flaws was produced. Five bars of dimensions 12.7 millimeters × 1.6 millimeters × 127 millimeters (½ inch × 1/16 inch × 5 inches) and a strip of dimensions 25.4 millimeters × 1.6 millimeters × 76.2 millimeters (1 inch × 1/16 inch × 3 inches) were cut from the plaque. The bars were tested for flammability in accordance with the procedure of the Vertical Burning Test for Classifying Materials 94V-0, 94V-1, or 94V-2 of UL 94 Standard for Tests for Flammability of Plastic Materials for Parts in Devices and Appliances, ANSI/UL-94-1979, dated Jan. 24, 1980. The strip was tested for flexibility by holding the strip near the ends and slowly bending the strip until the ends touched. If the strip did not crack, the flexibility test was passed; otherwise the flexibility test was failed.

Abbreviations correlated to the corresponding ingredients are shown in Table 1. The formulations and the results are shown in Tables 2 and 3.

TABLE 1

| Abbreviation | Ingredient |
|---|---|
| HIPS | Mobil PS4100 ® impact grade polystyrene (polystyrene-polybutadiene mixture containing from 4 to 10 percent polybutadiene), Mobil Oil Corporation. |
| APP | Exolit ® 422 ammonium polyphosphate, Hoechst Celanese Corporation. |
| THEIC | Tris(2-hydroxyethyl) isocyanurate. |
| ZB | Zinc borate-3.5 water, Climax Performance Materials Corporation. |
| ESB1 | Stereon ® 840A elastomeric styrene-butadiene block copolymer, Firestone Tire & Rubber Co. |
| ESB2 | Finaprene ® 502 elastomeric styrene-butadiene block copolymer, Fina Oil and Chemical Co. |

TABLE 2

| | Examples | |
|---|---|---|
| | 1 | 2 |
| Formulation, wt % | | |
| HIPS | 30.0 | 35.0 |
| APP | 31.0 | 27.28 |
| THEIC | 13.5 | 11.88 |
| ZB | 5.5 | 4.84 |
| ESB1 | 20.0 | 20.0 |
| ESB2 | 0 | 0 |
| TiO$_2$ | 0 | 1.0 |
| Melamine | 0 | 0 |
| UL-94 Rating | V-0 | V-0 |
| Flexibility | Pass | Pass |

TABLE 3

| | Comparative Examples | | | | | |
|---|---|---|---|---|---|---|
| | 1 | 2 | 3 | 4 | 5 | 6 |
| Formulation, wt % | | | | | | |
| HIPS | 35.0 | 40.0 | 35.0 | 50.0 | 60.0 | 50.0 |
| APP | 33.75 | 4.0 | 4.95 | 24.8 | 24.8 | 24.8 |
| THEIC | 6.75 | 30.0 | 27.9 | 10.8 | 10.8 | 10.8 |
| ZB | 0 | 6.0 | 12.15 | 4.4 | 4.4 | 4.4 |

TABLE 3-continued

| | Comparative Examples | | | | | |
|---|---|---|---|---|---|---|
| | 1 | 2 | 3 | 4 | 5 | 6 |
| ESB1 | 20.0 | 20.0 | 20.0 | 10.0 | 0 | 0 |
| ESB2 | 0 | 0 | 0 | 0 | 0 | 10.0 |
| TiO$_2$ | 0 | 0 | 0 | 0 | 0 | 0 |
| Melamine | 4.5 | 0 | 0 | | | |
| UL-94 Rating | V-2 | V-2 | V-1 | V-0 | ND[1] | V-0 |
| Flexibility | Pass | Pass | Pass | Fail | ND[1] | Fail |

[1]ND = Not determined; cracked upon cutting.

Although the present invention has been described with reference to specific details of certain embodiments thereof, it is not intended that such details should be regarded as limitations upon the scope of the invention except insofar as they are included in the accompanying claims.

I claim:

1. An intumescent nonhalogenated flame retardant polystyrene composition comprising:
   (a) polystyrene;
   (b) ammonium polyphosphate wherein the weight ratio of said ammonium polyphosphate to the polystyrene in said intumescent nonhalogenated flame retardant polystyrene composition is in the range of from 0.2:1 to 3.2:1;
   (c) tris(2-hydroxyethyl) isocyanurate;
   (d) hydrated zinc borate; and
   (e) substantially amorphous elastomeric polymer wherein the weight ratio of said substantially amorphous elastomeric polymer to said polystyrene in said intumescent nonhalogenated flame retardant polystyrene composition is in the range of from 0.05:1 to 0.4:1.

2. The intumescent nonhalogenated flame retardant polystyrene composition of claim 1 wherein:
   (a) the weight ratio of said tris(2-hydroxyethyl) isocyanurate to said polystyrene in said intumescent nonhalogenated flame retardant polystyrene composition is in the range of from 0.04:1 to 2:1; and
   (b) the weight ratio of said hydrated zinc borate to said polystyrene in said intumescent nonhalogenated flame retardant polystyrene composition is in the range of from 0.005:1 to 0.8:1.

3. The intumescent nonhalogenated flame retardant polystyrene composition of claim 1 wherein:
   (a) the weight ratio of said ammonium polyphosphate to said polystyrene in said intumescent nonhalogenated flame retardant polystyrene composition is in the range of from 0.3:1 to 2:1;
   (b) the weight ratio of said tris(2-hydroxyethyl) isocyanurate to said polystyrene in said intumescent nonhalogenated flame retardant polystyrene composition is in the range of from 0.1:1 to 1:1;
   (c) the weight ratio of said hydrated zinc borate to said polystyrene in said intumescent nonhalogenated flame retardant polystyrene composition is in the range of from 0.05:1 to 0.5:1 and
   (d) the weight ratio of said substantially amorphous elastomeric polymer to said polystyrene in said intumescent nonhalogenated flame retardant polystyrene composition is in the range of from 0.08:1 to 0.3:1.

4. The intumescent nonhalogenated flame retardant polystyrene composition of claim 1 wherein:
   (a) the weight ratio of said ammonium polyphosphate to said polystyrene in said intumescent nonhalogenated flame retardant polystyrene composition is in the range of from 0.5:1 to 1:1;
   (b) the weight ratio of said tris(2-hydroxyethyl) isocyanurate to said polystyrene in said intumescent nonhalogenated flame retardant polystyrene composition is in the range of from 0.2:1 to 0.5:1;
   (c) the weight ratio of said hydrated zinc borate to said polystyrene in said intumescent nonhalogenated flame retardant polystyrene composition is in the range of from 0.1:1 to 0.2:1; and
   (d) the weight ratio of said substantially amorphous elastomeric polymer to said polystyrene in said intumescent nonhalogenated flame retardant polystyrene composition is in the range of from 0.1:1 to 0.2:1.

5. The intumescent nonhalogenated flame retardant polystyrene composition of claim 1 wherein said hydrated zinc borate is zinc borate-3.5 water.

6. The intumescent nonhalogenated flame retardant polystyrene composition of claim 1 wherein said hydrated zinc borate is represented by the formula $2ZnO.3B_2O_3.3.5H_2O$.

7. The intumescent nonhalogenated flame retardant polystyrene composition of claim 1 wherein said substantially amorphous elastomeric polymer is substantially amorphous elastomeric styrene-butadiene block copolymer, polybutadiene, or a mixture thereof.

8. The intumescent nonhalogenated flame retardant polystyrene composition of claim 1 which further comprises alkylamine wherein the alkyl group of said alkylamine contains from 12 to 32 carbon atoms.

9. The intumescent nonhalogenated flame retardant polystyrene composition of claim 8 wherein the weight ratio of said alkylamine to said polystyrene in said intumescent nonhalogenated flame retardant polystyrene composition is in the range of from 0.0001:1 to 0.2:1.

10. The intumescent nonhalogenated flame retardant polystyrene composition of claim 9 wherein said alkylamine is stearylamine.

11. The intumescent nonhalogenated flame retardant polystyrene composition of claim 1 which further comprises titanium dioxide.

12. The intumescent nonhalogenated flame retardant polystyrene composition of claim 11 wherein the weight ratio of said titanium dioxide to said polystyrene in said intumescent nonhalogenated flame retardant polystyrene composition is in the range of from 0.0001:1 to 0.2:1.

13. The intumescent nonhalogenated flame retardant polystyrene composition of claim 12 wherein said titanium dioxide is rutile.

14. The intumescent nonhalogenated flame retardant polystyrene composition of claim 11 wherein the weight ratio of said titanium dioxide to said polystyrene in said intumescent nonhalogenated flame retardant polystyrene composition is in the range of from 0.002:1 to 0.1:1.

15. The intumescent nonhalogenated flame retardant polystyrene composition of claim 11 wherein the weight ratio of said titanium dioxide to said polystyrene in said intumescent nonhalogenated flame retardant polystyrene composition is in the range of from 0.005:1 to 0.05:1.

* * * * *